Aug. 9, 1927.  
M. FEYBUSCH  
1,638,480  
CONTAINER OR RECEPTACLE FOR THE DISPENSING OF ICE CREAM, ICES, OR THE LIKE  
Filed Feb. 18, 1926  
2 Sheets-Sheet 1
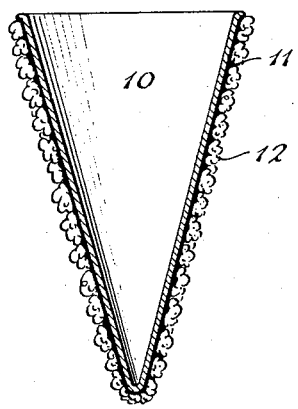
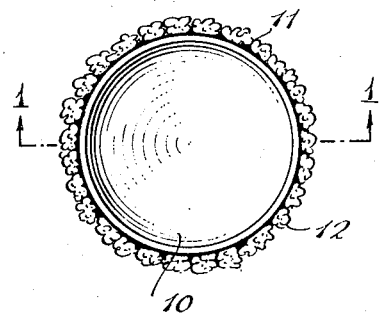
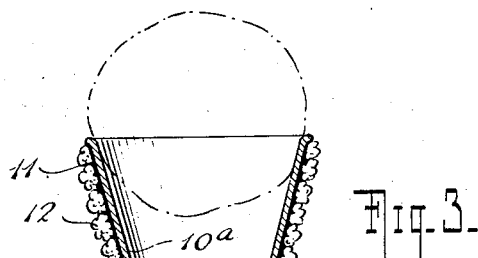
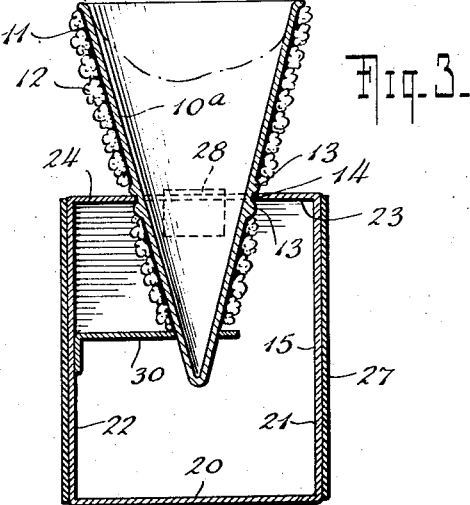
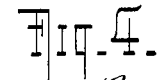
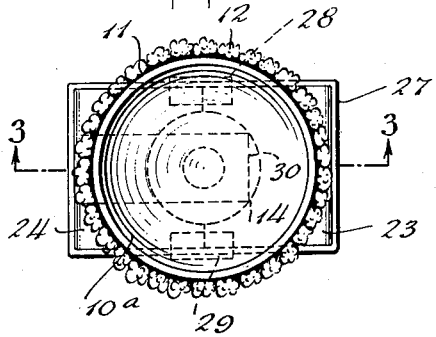
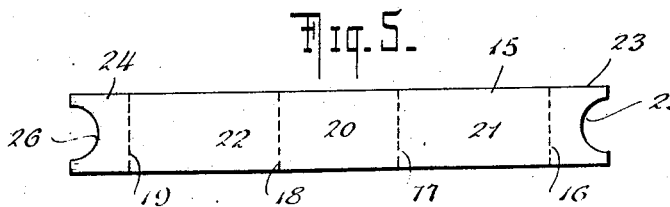
INVENTOR  
MARTIN FEYBUSCH  
BY  
ATTORNEYS Aug. 9, 1927.  M. FEYBUSCH  1,638,480
CONTAINER OR RECEPTACLE FOR THE DISPENSING OF ICE CREAM, ICES, OR THE LIKE
Filed Feb. 18, 1926  2 Sheets-Sheet 2
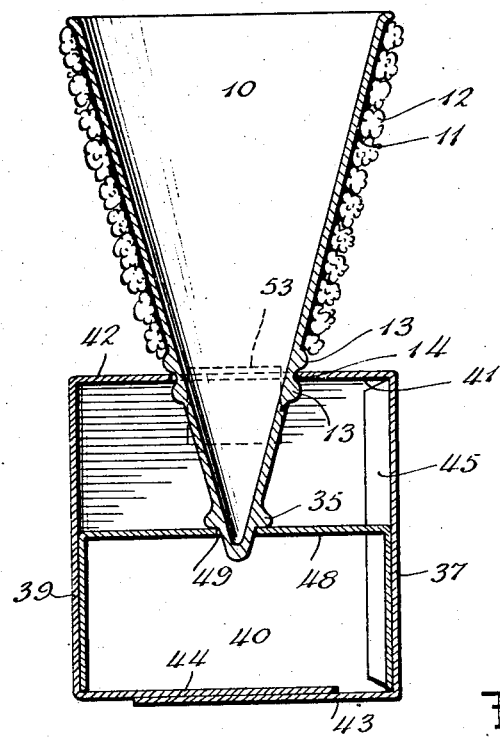
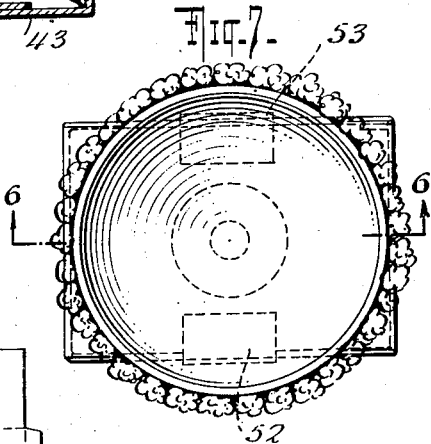
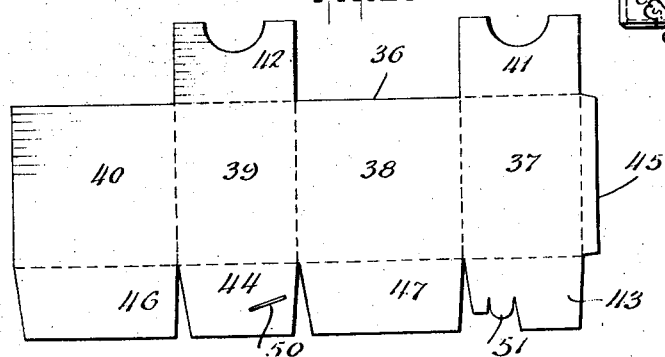
INVENTOR
MARTIN FEYBUSCH
BY
ATTORNEYS Patented Aug. 9, 1927.

1,638,480

UNITED STATES PATENT OFFICE.

MARTIN FEYBUSCH, OF BROOKLYN, NEW YORK.

CONTAINER OR RECEPTACLE FOR THE DISPENSING OF ICE CREAM, ICES, OR THE LIKE.

Application filed February 18, 1926. Serial No. 89,084.

This invention relates to containers or receptacles for the dispensing of ice cream, ices or the like, and particularly to that class of containers commonly known as ice cream cones. Ice cream cones are usually made of a thin pastry which is very fragile and brittle, and the cones consequently are very easily broken in the handling thereof. Furthermore, after the cones are filled with ice cream, the melting of the cream, due largely to the heat from the consumer's hand, causes the pastry to become soaked; the pastry becoming a sodden pulpy mass, the exterior of which is wet and sticky.

The principal object of this invention is to provide a new and improved construction by means of which the objectionable features of the well kown ice cream cone are overcome.

Another object is to provide a new and improved construction in which the cone is coated with a brittle edible substance, such as, for instance, popcorn, peanuts or so-called peanut brittle, puffed rice, etc. According to another feature of my invention, an ice cream cone may be sold permanently associated, and in combination with a carton adapted to contain any suitable confections and prizes of the type commonly sold as "prize candies."

The above and other objects will appear more fully from the following more detailed description and by reference to the accompanying drawing forming a part hereof, in which Fig. 1 is a central section taken on the line 1—1 of Fig. 2 of an ice cream cone embodying my invention; Fig. 2 is a plan view of the structure shown in Fig. 1; Fig. 3 is a central vertical section taken on the line 3—3 of Fig. 4 showing a constructional example of a combination of an ice cream cone and carton; Fig. 4 is a plan view of the structure shown in Fig. 3; Fig. 5 is a development of the inner carton shown in Figs. 3 and 4; Fig. 6 is a central sectional view taken on the line 6—6 of Fig. 7 of a different constructional example of a combination of ice cream cone and carton; Fig. 7 is a plan view of the structure shown in Fig. 6; Fig. 8 is a development of the carton shown in Fig. 7, and Fig. 9 is a development of the supporting member used in the interior of the carton of Figs. 6 and 7.

In order to give greater strength and stability to the ice cream cone, and at the same time to provide the pastry of the cone with an outer layer of edible material having heat insulating properties, I take the usual pastry ice cream cone 10 and provide the same with a coating 11 of an edible adhesive material, such as, for example, molasses. This coating obviously may be applied to the cone in any desirable manner, as by dipping or brushing. After the coating is applied to the exterior of the cone, the cone is then rolled in popcorn to cause the popcorn to adhere to the molasses and form an outer layer 12 on the exterior of the cone, after which the cone is subjected to a slight baking to set the adhesive coating thereto. The cone thus treated is considerably strengthened by the outer layer of popcorn, and as the popcorn is a very poor conductor of heat, the layer thereof forms a heat insulating envelope. In addition, the coating of molasses forms a practically waterproof intermediate envelope, so that any liquid which might collect within the cone, due to the melting of the ice cream, cannot pass outwardly through the pastry walls of the cone and render the exterior wet and sticky. Due to the irregular configuration of the outer popcorn envelope, any liquid which might trickle down the exterior wall of the cone will pass between the crevices formed between adjacent pieces of popcorn and therefore will not soil the hand of the user. The popcorn and molasses both being edible, the resulting confection, particularly when eaten with the ice cream contents, is highly palatable. Instead of popcorn, I might employ other brittle edible substances, such as peanuts or puffed rice.

The construction of the cone above described is also particularly adapted for combination with a carton such as shown in Figs. 3 to 9 inclusive of the drawing, but the combination of the carton and ice cream cone is not, however, limited to a cone of the type above described, as it will be understood that the ordinary ice cream cone may be constructed in accordance with the principle presently to be set forth, so to enable it to be sold in combination with a carton. As shown in Figs. 3 to 5 inclusive of the drawing, I provide the exterior wall of the pastry cone 10ª at a point between the upper and lower ends thereof with a pair of annular beads 13, having a recess 14 located centrally of the beads. As shown in Fig. 5 the carton is preferably constructed of a single strip 15 of thin cardboard, provided with the scored lines 16, 17, 18 and 19. The strip 15 is bent upon the lines 17 and 18 to form the bottom 20 and the side walls 21 and 22; the side walls extending at right angles to the bottom wall, as clearly shown in Fig. 3. The strip is then bent upon the lines 16 and 19 to bring the tab portions 23 and 24 into parallelism with the bottom 20, the half-round cutout portions 25 and 26 which are provided in the tabs 23 and 24 respectively, being fitted within the recess 14 of the cone. A cup shaped outer slide 27 is then placed over the assembled carton to hold the carton in engagement with the cone, after which the slide is secured against movement outwardly of the carton by means of the adhesive seals 28, 29. In order to prevent the cone from wabbling or tilting after the carton has been secured thereto, I preferably provide the interior of the carton 15 with a supporting shelf 30, suitably secured to one of the side walls of the carton and having an aperture therein in which the lower smaller end of the cone is inserted. Before completing the assembly of the carton, that is, before the slide 27 has been slipped into position, the interior of the carton 15 may be filled with any suitable confection.

In the form shown in Figs. 6 to 9 inclusive, of the drawing, I provide the cone with the annular beads 13 as in the preceding example, with the recess 14 located between said beads. In this form of the invention, I have shown the beads and recess as located nearer to the bottom or smaller end of the cone, and only that portion of the cone above the beads and recess is coated with the adhesive coating 11, and the popcorn coating 12. In addition, I may provide the cone with a second annular projection or bead 35, located closely adjacent to the lower extremity of the cone.

Instead of employing a carton constructed of an inner member and an outer slide as shown in Figs. 3 to 5 inclusive, the carton may be constructed of a single sheet of material 36, as shown in Fig. 8 of the drawing. This sheet of material is provided with a plurality of scored lines to divide the sheet into the side walls 37, 38, 39 and 40. The side walls 37 and 39 have the top sections 41 and 42 projecting laterally from the top thereof, while from the bottom of said side walls the securing flaps 43 and 44 project. One end of the blank is provided with a projecting tab 45, which is adapted, when the blank is folded into its final form, to engage with the inner face of the side wall 40. The side walls 38 and 40 are preferably provided at their lower ends with the flaps 46 and 47 respectively to form a thicker more sturdy bottom construction. For the purpose of providing a support for the bottom of the cone, I preferably provide a small supporting shelf 48, provided with scored lines, so that the shelf may be folded to form the inverted U-shaped member shown in assembled position in Fig. 6 of the drawing with the aperture 49 at the center of the strip placed about the lower end of the cone and in contact with the lower projecting bead 35. The securing flap 44 is preferably provided with a slot 50 in which the locking tab 51 of the flap 43 is adapted to be inserted when the carton is folded into its final form; the interlocking of the flap and slot holding the carton securely in locked position. If desired, the flaps 43, 44, 45 and 46 may be coated with adhesive before the carton is folded into its final form. It will be understood that the carton may be filled with any suitable confections and prizes before it is finally closed. To prevent accidental opening of the carton and as indication to the purchaser that the carton has not been opened, small adhesive seals 52, 53 are preferably secured upon the carton after it has been filled and secured to the cone.

It will be understood that the constructional details of the cartons herein disclosed are merely illustrative examples, and that many changes, variations and modifications of the constructional features of the cartons may be resorted to. Likewise, it will be understood that the particular location and construction of the beads and recesses for securing and interlocking the cone and carton together, are merely illustrative.

It will also be understood that the cone shape of the ice cream container is merely given by way of example and not as limiting the invention to an edible ice cream container of any particular shape.

I claim:

1. The combination with an ice cream cone, of a container adapted to contain confections or the like, said cone and container being provided with co-operating interlocking means to hold them in secure engagement.

2. The combination with an edible container adapted to contain ice cream or the like, of a carton adapted to contain confections, said carton and container being provided one with a recess and the other with a projecting rib adapted to seat within said recess to hold said container and carton in interlocking engagement.

3. The combination with an edible container for ice cream or the like, of a carton, adapted to contain confections, said container being provided with a pair of projecting annular beads and a recess between said annular beads, and said carton having the top portion thereof provided with a cutout adapted to fit snugly within said recess to interlock said carton and container together.

4. The combination with an ice cream cone, of a carton adapted to contain confections or the like, said cone being provided with an annular recess, and the top of said carton having a cutout portion adapted to encircle and fit snugly within said recess to lock said cone and carton securely together.

5. The combination with an edible container adapted to contain ice cream or the like, of a carton adapted to contain confections or the like, said carton comprising an inner member formed by a strip of cardboard bent to provide a bottom, side walls and a top portion, and an outer slide adapted to encase said inner member, said container being provided with a pair of projecting beads with a recess between said beads and the top portion of said inner member having a cutout portion adapted to encircle and fit within said recess to hold said container and carton in interlocking engagement.

6. The combination with an edible container for ice cream or the like, of a carton adapted to contain confections or the like, said carton having side walls, a bottom portion and top portions, said container being provided with a projecting bead and said top portions of said carton having a cutout recess adapted to encircle said container adjacent to said bead to hold said container securely locked to said carton.

7. The combination as set forth in claim 6 in which said carton is provided with a supporting shelf to engage the lower end of said container which shelf co-operates with the top portion of said carton to prevent tilting of said container relatively to said carton.

8. The combination with an edible container adapted to contain ice cream or the like, of a carton adapted to contain confections or the like, said container being provided with a pair of projecting beads, and said carton having a cutout top portion adapted to encircle said container adjacent to one of said beads to lock said container securely to said carton, and a supporting shelf mounted within said carton and having a cutout portion adapted to encircle said container adjacent to the other of said beads.

In testimony whereof I have hereunto set my hand.

MARTIN FEYBUSCH.